July 17, 1923.

F. C. MILLER

WHEEL TIRE

Filed Oct. 24, 1921

Witnesses:
W. F. Kilroy
Harry R. L. White

Inventor:
Frederick C. Miller
By
Attys.

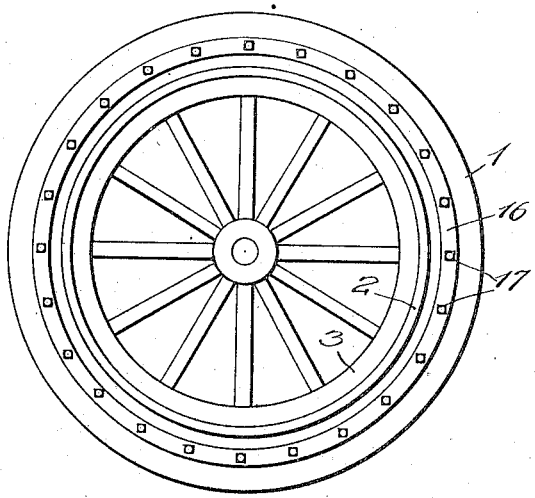
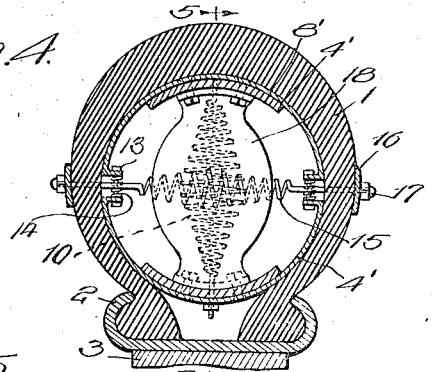
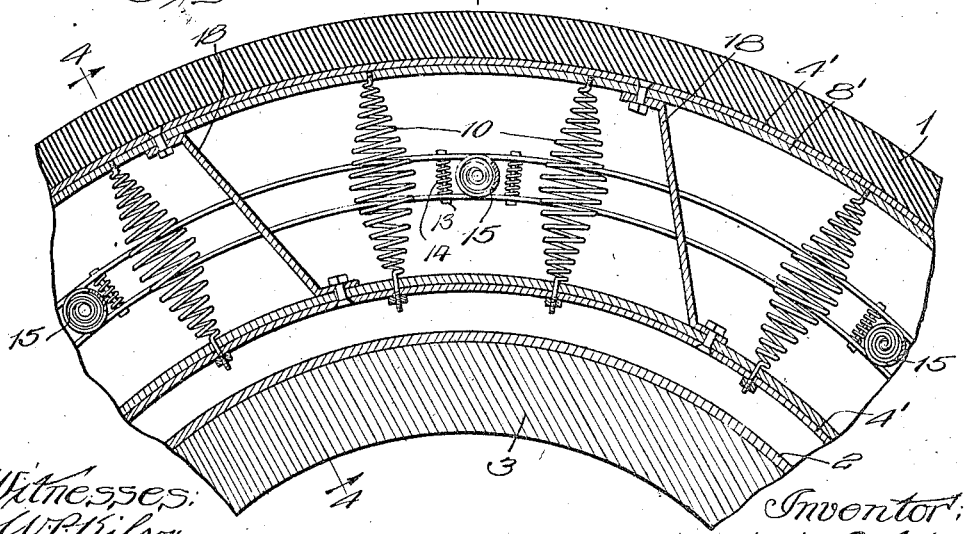

Patented July 17, 1923.

1,461,928

UNITED STATES PATENT OFFICE.

FREDERICK C. MILLER, OF CHICAGO, ILLINOIS.

WHEEL TIRE.

Application filed October 24, 1921. Serial No. 509,936.

*To all whom it may concern:*

Be it known that I, FREDERICK C. MILLER, a citizen of the United States, residing at Chicago, in the county of Cook and State of Illinois, have invented certain new and useful Improvements in Wheel Tires, of which the following is a description.

My invention relates to improvements in wheel tires, and more specifically to a device which may be substituted for the ordinary inner tube of a pneumatic tire, and which, while of a metallic structure, will be perfectly resilient and will perfectly absorb the road shocks given the vehicle upon which the wheel is mounted.

My invention has among its other objects the production of a device of the kind described which is durable, reliable, efficient and satisfactory for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a radial cross section taken through a felly and casing showing my device in position therein;

Fig. 4 is a sectional view taken substantially on the line 4—4 of Fig. 5 and illustrating a modified form of device;

Fig. 5 is a sectional view taken substantially on the line 5—5 of Fig. 4;

Fig. 6 is a side elevation of a felly with my improved tire in place.

Figure 1:
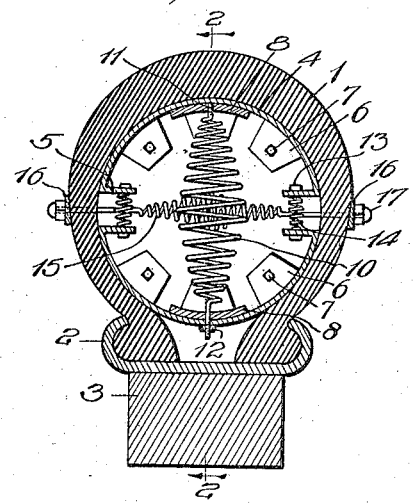

In the drawings, wherein I have illustrated the preferred embodiments of my invention, 1 represents an outer casing or shoe of an automobile tire, said casing being made of rubber and fabric in the usual manner well known to those skilled in the art and is adapted to fit about the removable or stationary rim 2, said rim being adapted to be mounted upon a felly 3. Any type of felly or rim may be employed, as my device is adapted to be used with hollow casings on all types of fellies and rims.

Figure 2:
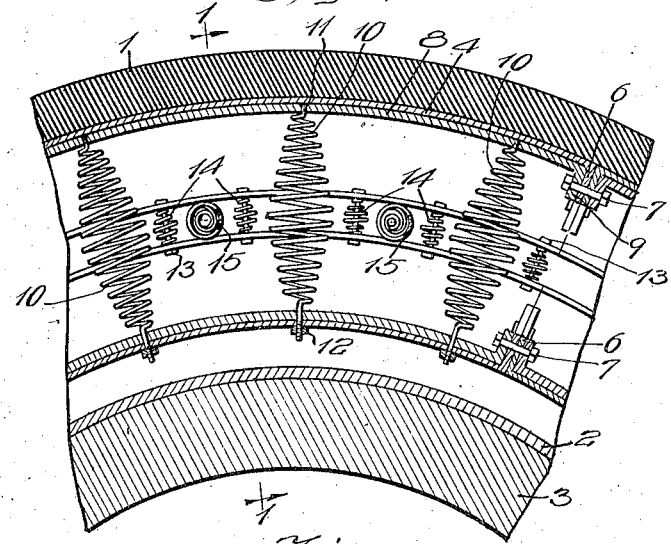
Fig. 2 is a sectional view taken substantially on the line 2—2 of Fig. 1.

Arranged within the outer casing 1 is a pair of annular shells or housing members 4, substantially semi-circular in radial cross-section, the adjacent side edges of the shells being preferably inturned in any suitable manner as at 5, Fig. 1, and provided with a series of bolt or pin-receiving apertures annularly of the inturned flanges 5. Each of the annular semi-circular housing members 4 may be made in one or more parts, as shown in Fig. 2, wherein the ends of the arcuate sections are bent radially inwardly as at 6, and registering apertures are provided in said inturned ends so that the adjoining sections may be placed end to end with the apertures in the inturned ends 6 in registry with one another so that bolts or other suitable or equivalent fastening means 7 may be positioned therethrough to hold said sections together in place.

An annularly extending plate 8 is arranged to extend along the tread line or center line of each of the sections 4, for the purpose of reinforcing said members along said median line, said reinforcing plates constructed in one or more parts and having inturned ends 9 similar to the inturned ends 6 of sections 4, and provided with bolt holes registering with the bolt holes through the ends 6, so that the bolts 7 may be positioned through the bolt holes of the reinforcing members and housing members to hold all of said parts together. Similar reinforcing sections 8 may be arranged along the inside surface of the inner members of the housing or casing. Arranged in an annular series centrally about the tire are a plurality of springs 10, each extending radially between the semi-circular sections 4, and preferably tapering from both its ends to the center, so as to provide a double cone in side elevation. It will be noted that both the ends of the springs 10 are threaded and that the outer end 11 is threadedly secured in a tapped hole in the outer reinforcing member 8, as shown in the drawings, the inner end of the spring projecting through aligned apertures in both the reinforcing member and shell member, so that a nut 12 may be threadedly secured to said free end, whereby the tension of the spring may be adjustably varied, as desired. Between the spaced side edges of the adjacent inner and outer sections 4 are arranged guide bolts 13, said bolts extending through the apertures provided in the inturned flanges 5 of said sections. Encircling the bolts 13 are coil springs 14, whereby the movement of said sections 4 toward each other will be yieldably resisted by the springs 14 in addition to the resistance of the main central springs 10, and the separation of said sections 4 will be limited by the bolts 13.

Extending through the casing in a direction parallel to the axis of the felly are a series of springs 15, said springs being arranged in an annular series, alternately with and midway of adjacent springs 10. On each side of the casing is arranged an annular ring or support band 16 suitably apertured so that the ends of the springs 15 may project therethrough, and nuts 17 are threaded onto the projecting ends of the springs 15 and bearing against the annular rings 16. Thus it is seen that there is provided a tire in which a radial contraction or expansion is permitted by the springs 10 and 14 and in which the expansion of the tire in a direction parallel to the felly axis is yieldably resisted by the springs 15.

Figure 3:
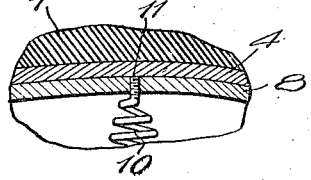
Fig. 3 is a fragmentary detail showing the manner of securing one end of the radial springs.

In the modification shown in Figs. 4 and 5, the auxiliary springs 14 at the spaced side edges of the shell members are shown and flat spring plates 18 have been provided in an annular series between the sections 4′, 4′. Each of the plate members 18 extends at an angle to the radius of the felly, that is, one end of each of the plate members is secured to the reinforcing member 8′ and the shell or housing member 4′ annularly in advance, in a circumferential direction to its connection at the other end to the corresponding reinforcing member and shell member. It will be easily seen that when the spring plates 18 are connected in an annular series between the cooperating sections 4′, 4′, one end forwardly in circumferential advance relative to the other end that the sections 4′, 4′, may have a movement relative to one another in a circumferential direction. In order that the bolts 13 shall not hinder this circumferential movement between the cooperating sections 4′, 4′, the bolt holes may be enlarged or elongated, or any other suitable means may be employed to accomplish the desired result. This is especially desirable on the rear wheels or drive wheels of a vehicle, so that said spring plates may overcome any shock to the tire caused by a quick application of the brake. In other details the modification shown in Figs. 4 and 5 is substantially similar to that shown in Figs. 1, 2 and 3.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described and in combination, a felly adapted to receive an outer casing thereon, a pair of substantially semi-cylindrical members arranged annularly within said casing, the adjacent annular side edges of said members spaced apart, circumferentially spaced springs extending through said casing between both of said spaced side edges in a direction substantially parallel to the axis of the casing, and means for yieldably resisting the radial movement of said semi-cylindrical members.

2. In a device of the kind described and in combination, a felly adapted to receive an outer casing thereon, a pair of annular members substantially semi-circular in cross-section within said casing, the adjacent annular side edges of said members spaced apart, annular rings at the exterior opposite sides of the casing, circumferentially spaced tension springs extending through said casing between both said spaced side edges and connected to said annular rings, and means for yieldably resisting radial movement of said pair of annular members.

3. In a device of the kind described and in combination, a felly adapted to receive an outer casing thereon, a pair of annular members substantially semi-circular in radial cross-section within said casing, the adjacent annular side edges of said members spaced apart, circumferentially arranged springs connecting said pair of annular members along their center lines, and means independent of said last-mentioned springs for limiting the separation of said members but yieldably permitting their movement toward each other.

4. In a device of the kind described and in combination, a felly adapted to receive an outer casing thereon, a pair of annular members substantially semi-circular in radial cross-section within said casing, the adjacent annular side edges of said members spaced apart, tension springs extending through said casing between both of said spaced side edges in a direction substantially parallel to the axis of the casing, and circumferentially arranged springs connecting said pair of annular members along their center lines.

5. In a device of the kind described and in combination, a felly adapted to receive an outer casing thereon, a pair of annular members substantially semi-circular in radial cross-section within said casing, the adjacent annular side edges of said members spaced apart, tension springs extending through said casing between both of said spaced side edges in a direction substantially parallel to the axis of the casing, circumferentially arranged springs connecting said pair of annular members along their center lines, and means independent of said last-mentioned springs for limiting the separation of said members but yieldably permitting their movement toward each other.

6. In a device of the kind described and in combination, a felly adapted to receive an outer casing thereon, a pair of annular members each substantially semi-circular in radial cross-section within said casing, the adjacent annular side edges of said members spaced apart, and spring plates arranged in an annular series between said members, said plates connected at their ends to said members, each plate having one end spaced circumferentially in advance of the other connected end.

7. In a device of the kind described and in combination, a felly adapted to receive an outer casing thereon, a pair of annular members substantially semi-circular in radial cross-section within said casing, the adjacent annular side edges of said members spaced apart, cimcumferentially spaced tension springs extending through said casing between both said spaced side edges in a direction substantially parallel to the axis of the casing, and spring plates between adjacent tension springs and having their opposite ends connected to said members, each of said spring plates having one end spaced in circumferential advance of the other end.

8. In a device of the kind described and in combination, a felly adapted to receive an outer casing thereon, a pair of parallel, flexible, metallic annular inner and outer housing members substantially semi-circular in radial cross-section within said casing, the adjacent annular side edges of said members spaced apart, reinforcing plates extending circumferentially at the inside surface of said inner and outer housing members centrally thereof, a series of circumferentially spaced springs extending radially between said members, said springs being threaded at both their ends, one of said threaded ends threaded into the outer reinforcing plate, and the other of said threaded ends projecting slidably through said inner reinforcing plate and semi-circular housing section, and means for adjusting the tension of said springs.

In testimony whereof, I have hereunto signed my name in the presence of two subscribing witnesses.

FREDERICK C. MILLER.

Witnesses:
BEN V. ZILLMAN,
RUTH M. EPHRAIM.